United States Patent [19]

Shoup

[11] Patent Number: 4,786,618
[45] Date of Patent: Nov. 22, 1988

[54] SOL-GEL METHOD FOR MAKING ULTRA-LOW EXPANSION GLASS

[75] Inventor: Robert D. Shoup, Corning, N.Y.
[73] Assignee: Corning Glass Works, Corning, N.Y.
[21] Appl. No.: 55,632
[22] Filed: May 29, 1987
[51] Int. Cl.⁴ ............................................. C03C 3/06
[52] U.S. Cl. .................................. 501/12; 501/54; 501/55; 252/313.2; 252/315.6; 423/78; 423/338
[58] Field of Search ........................ 501/12, 54, 55; 252/313.2, 315.6; 423/78, 338

[56] References Cited
U.S. PATENT DOCUMENTS

| | | | |
|---|---|---|---|
| 3,597,252 | 8/1971 | Schröder et al. | 501/54 |
| 3,678,144 | 7/1972 | Shoup | 501/12 |
| 4,576,921 | 3/1986 | Lane | 501/12 |

Primary Examiner—William R. Dixon, Jr.
Attorney, Agent, or Firm—Kees van der Sterre

[57] ABSTRACT

Ultra-low thermal expansion $TiO_2$—$SiO_2$ glasses are prepared using a sol-gel process wherein a stable alkali silicate solution comprising colloidal $TiO_2$ and having a pH above 9 is gelled to form a semisolid silicate gel, the gel comprising homogeneously dispersed colloidal $TiO_2$ but being essentially free of agglomerated $TiO_2$ particles, washing the gel with aqueous media to remove alkali therefrom, and finally drying and consolidating the gel to a clear, void-free $TiO_2$—$SiO_2$ glass which is substantially free of compositional inhomogeneities and has a thermal expansion coefficient below that of pure fused silica.

13 Claims, 1 Drawing Sheet

SOL-GEL METHOD FOR MAKING ULTRA-LOW EXPANSION GLASS

BACKGROUND OF THE INVENTION

The government has rights in this invention under contract number F19628-85-C-0048 awarded by the U.S. Air Force.

Fused silica or quartz glasses are well known for certain physical characteristics rendering them unique among glasses. For example, such glasses demonstrate excellent refractoriness, enabling them to be used at very high temperatures. They also exhibit chemical inertness, especially to acids. Finally, they possess a very low coefficient of thermal expansion, i.e., in the range of about $5-10\times10^{-7}/°$ C. over the temperature range of 0–300° C. This latter property of low thermal expansion renders the glasses particularly valuable for the fabrication of optical components wherein precise dimensions must be retained by the structure over a rather broad temperature regime.

Fused silica products are presently formed by the fusion of slip-cast preforms, by the fusion of deposits produced through the flame oxidation of silicon-containing source compounds, or by melting silica batch materials at very high temperatures, e.g., 2000° C. or above. As can be appreciated, the geometry and dimensions of shapes produced by these methods are somewhat limited and, in addition, the physical properties of the glasses may vary depending on the source of raw materials. Thus vitreous silica of very high purity is of the highest utility for the manufacture of technical products since properties variations due to impurities are largely avoided.

The method of choice for the manufacture of high-purity vitreous silica is the flame oxidation of source compounds such as silicon tetrachloride. U.S. Pat. No. 2,272,342 provides a general description of the manufacture of pure fused silica products by this method. However, as the disclosure of that patent suggests, the shape of products which can be formed through this method is quite limited and the cost of manufacture for products of complex configuration is therefore quite high. Ordinarily, the manufacture of complex structures in pure fused silica by this process requires that the glass boules originally deposited by flame oxidation be cut into plates or other shapes and thereafter fusion-bonded to form more complicated structures.

U.S. Pat. No. 2,326,059 describes a flame oxidation process for glass manufacture which is closely related to that of the above patent, but which produces a glass having an average coefficient of thermal expansion even lower than that of fused silica. The patent describes depositing a $TiO_2$—$SiO_2$ glass using a flame oxidation process as for fused silica, but using a mixture of $TiCl_4$ and $SiCl_4$ source compounds to provide a deposited glass wherein the $TiO_2$ content is about 5–11% by weight. This glass has an average linear coefficient of thermal expansion of less than about $5\times10^{-7}/°C.$, but again, requires cutting and shaping to provide products of complex shape.

Because of these various fabrication difficulties there is still a substantial demand for a method for preparing fused silica articles of high purity at relatively low cost and in essentially unlimited shapes. One approach which has been developed to solve this problem, described in U.S. Pat. No. 3,678,144, involves the so-called sol-gel process. In that process, aqueous silicate solutions comprising dissolved alkali silicate compounds, colloidal silica, and/or quaternary ammonium silicate compounds are caused to gel in a controlled fashion to produce a semisolid silicate gel which can be further processed to provide high-silica glass. The process generally involves adding to the silicate suspension, which is stable at pH values above about 10-11, a gelling agent which is effective to gradually reduce the pH of the solution. This affects a destabilization of the solution and causes the precipitation of silica therefrom. The silica precipitate forms a silica gel in the liquid medium which can be of very fine and uniform pore size.

The silica gel produced as described can be processed to remove alkali from the pore structure if desired, and can thereafter be dried and consolidated into a dense silica glass product. While obviously considerable shrinkage is involved in converting the gelled solution to solid glass, the shrinkage is reproducible and thus products of complex configuration can be provided by casting from these solutions.

Concurrently with the development of the sol-gel method described in U.S. Pat. No. 3,678,144, various approaches to the production of glasses containing oxides other than $SiO_2$ were proposed. U.S. Pat. No. 3,678,144 further teaches that soluble metal compounds dissolved in the silicate solution may be precipitated with the silica during the gelation process and provide additional components in the resulting porous or consolidated glasses. However, the metals which may be incorporated using that method are largely limited to water soluble, non-volatile compounds which do not unduly reduce the pH of the silicate solution, and which will form dissolved ionic or complex species in such solutions.

An alternative approach to the production of glass products of more complex composition is described in U.S. Pat. No. 4,112,032. In that patent, particulate additions of oxides or other compounds are made to the silicate solution, and these additives are trapped in the pore structure of the gel following precipitation and drying to a porous product. While $TiO_2$ is among the particulate materials which may be employed in accordance with the method of this patent, the method is not directed to the production of consolidated glasses, and thus no non-porous high silica glasses are reported.

The desirable low thermal expansion characteristics of $TiO_2$—$SiO_2$ glasses such as described in U.S. Pat. No. 2,326,059 are considered to require a homogeneous glass. That is, the microstructure of the glass must be such that the $TiO_2$ is not present in the glass as an isolated or concentrated titania phase, but is rather uniformly dispersed within the silica matrix forming the glass on a molecular or atomic scale. While such homogeneity is readily attained in vapor deposition methods for producing $TiO_2$—$SiO_2$ glasses, it is difficult to provide the required degree of homogeneity in processes involving the physical blending of the component solids, or even in silicate solutions.

Attempts to form low-expansion $TiO_2$—$SiO_2$ glasses from solutions of $TiO_2$ and $SiO_2$ in the past have been unsuccessful, due in part to a failure to achieve homogeneous mixed solutions free of precipitated $TiO_2$. Silicate solutions comprising $TiO_2$ in the form of precipitated crystallites or larger titania agglomerations will not provide glasses having the uniformity of structure required for extremely low thermal expansion characteristics.

It is therefore a principal objective of the present invention to provide a method for producing ultra-low expansion TiO$_2$—SiO$_2$ glasses using a sol-gel process.

It is a further object of the invention to provide a method for producing ultra-low expansion TiO$_2$—SiO$_2$ glasses which permits the manufacture of products of complex structure by direct casting.

It is a further object of the invention to provide ultra-low expansion TiO$_2$—SiO$_2$ glasses exhibiting average linear coefficients of thermal expansion (0°–300° C.) below about $5 \times 10^{-7}$/°C. which include minor but tolerable amounts of alkali metal and iron impurities.

Other objects and advantages of the invention will become apparent from the following description thereof.

SUMMARY OF THE INVENTION

The present invention provides a process for making titania-silica glasses using a sol-gel process which assures a homogeneous glass structure and therefore provides the ultra-low thermal expansion characteristics previously attainable only in vapor-deposited glasses in this composition system. Whereas aqueous solutions comprising silica and titania are employed in carrying out the inventive method, the premature precipitation of titania encountered in prior attempts to make such glasses is avoided and thus compositional inhomogeneities which could undesirably reduce glass clarity, increase the thermal expansion characteristics of the glass or, most importantly, result in variations in glass properties within individual glass components, are not permitted to develop.

The attainment of homogeneous titania-silica glasses in accordance with the invention requires the use of aqueous colloidal titania suspensions. Broadly characterized, the method first comprises preparing a homogeneous aqueous sol wherein the solid phase includes colloidal TiO$_2$ and the liquid phase is a silicate solution comprising dissolved SiO$_2$ compounds. Colloidal SiO$_2$ may also be present. The pH of the sol is maintained at a value above that at which either the SiO$_2$ or the TiO$_2$ will precipitate or gel. Depending on the silicate solution employed, pH values in the range of 9–13 are typically maintained.

The silica concentration of the solution or sol is maintained in the range of about 1–12 moles SiO$_2$/liter, and the TiO$_2$ concentration in the solution is established in the range of about 3–10% of the total of the effective SiO$_2$ concentration plus the TiO$_2$ concentration. By effective SiO$_2$ concentration is meant the concentration of any colloidal SiO$_2$ plus the SiO$_2$ concentration which would result from the conversion of all silicate compounds in the solution to SiO$_2$. The titania is preferably introduced in the form of an aqueous TiO$_2$ sol having a pH above about 9.0, and is gradually combined with the silicate solution to avoid premature TiO$_2$ precipitation.

The homogeneous titania-silica sol or solution thus provided is then caused to gel, typically by treatment with a suitable gelling agent, to form a homogeneous semisolid gel comprising polymerized SiO$_2$ and colloidal TiO$_2$. This gelation may be effected using organic gelling agents such as have been employed to promote the gelation of alkali silicate solutions in the prior art.

The gel thus provided is next washed in aqueous media to remove the majority of the alkali metal and/or ammonium ions present therein, these alkaline components having been introduced by the precursor solutions. Thereafter, the gel is dried to remove water from the pore structure thereof, thus to provide a dried gel consisting primarily of SiO$_2$ but containing the TiO$_2$ additive homogeneously distributed therein.

Finally, the dry gel is consolidated by heating to a temperature sufficient to sinter the porous gel to a dense nonporous TiO$_2$—SiO$_2$ glass article.

A titania-silica glass product produced in accordance with the above described method has a composition consisting essentially, in weight percent, of about 3–10% TiO$_2$, 90–97% SiO$_2$, about 10–200 ppm residual alkali metals, and 1–200 ppm residual iron. Notwithstanding the presence of residual alkali therein, the glass exhibits an average linear coefficient of thermal expansion over the range 0°–300° C. not exceeding about $5 \times 10^{-7}$/°C. This ultralow thermal expansion characteristic of the glass represents a substantial advance in the field of soluble silicate technology, particularly in view of the residual alkali content and use of sol-gel processing to make the glass.

The method of the invention is particularly advantageous in the production of low expansion silica glass products of complex configuration. Although shrinkage of the solution during the process of gelation, drying, and consolidation can be of the order of 50% by volume of the original casting, details of the initial cast shape are retained in the product such that castings of relatively high dimensional reproducibility and faithful adherence to designed shape may be provided.

DESCRIPTION OF THE DRAWING

The invention may be further understood by reference to the drawing wherein.

DETAILED DESCRIPTION

Figure 1:
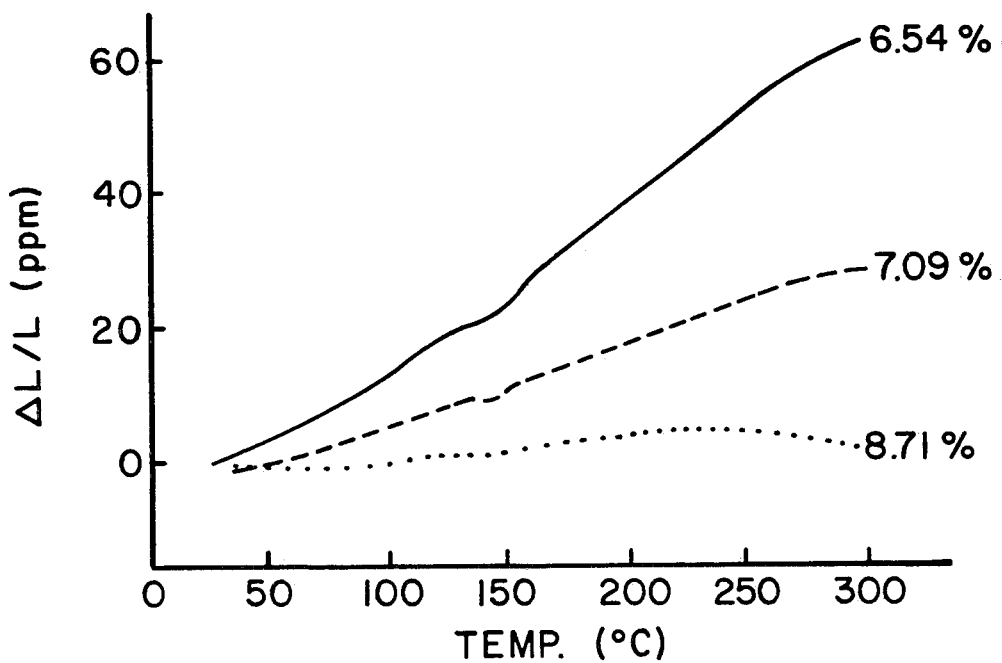
FIG. 1 is a plot showing sample expansion versus temperature for three TiO$_2$—SiO$_2$ glasses provided in accordance with the invention.

Silicate solutions useful for the production of silicate glasses by gelation are known in the prior art. Typically, these are true solutions comprising silicates, although colloidal suspensions of silica or of silicate compounds are also useful. Since silica itself is essentially insoluble in water, the silica in these solutions and/or suspensions is normally present in the form of a dissolved or suspended alkali metal silicate or organic ammonium silicate such as a quaternary ammonium silicate compound.

In order to maintain the silica in a dissolved or suspended colloidal state in such solutions, the concentration of alkali metal and/or ammonium ion must be sufficient to yield pH values greater than about 10 for ammonium silicates, and greater than about 11 for alkali silicates. Further, to secure gelation characteristics suitable for providing a firm homogeneous gel, the silica content of these solutions or colloids should be maintained in the range of about 1–12 moles/liter, more preferably 3–12 moles/liter.

As has been noted above, whereas dispersed titania particles or crystals can be added to these silicate suspensions and incorporated into the gel structure as the silica is precipitated therefrom, the resulting gels cannot be consolidated to fully transparent, ultra-low expansion glasses having uniform expansion characteristics throughout the body of the glass. In order to achieve the requisite homogeneity for low, uniform expansion characteristics, the $TiO_2$ component of the glasses of the present invention is incorporated as colloidal $TiO_2$, most preferably as an aqueous colloidal $TiO_2$ suspension stabilized at alkaline pH and free of precipitated $TiO_2$ particles.

In general, titania sols having pH values in the range of about 9-10 and titania concentrations in the range of 0.5-3 moles/liter can be used. The preferred sols are those using quaternary ammonium counter ions. The avoidance of premature titania precipitation from these sols is achieved by maintaining the pH at high values during the step of blending the titania and silicate components, and by carrying out the blending slowly and with continued stirring. In cases where the solublizing or stabilizing bases (ammonium or alkali) of the $TiO_2$ and silicate suspensions differ, as where a quaternary ammonium titania sol is to be combined with an alkali silicate solution, the preferred practice is to introduce the silicate slowly into the titania sol, to permit gradual equilibration of the solublizing constituents.

Gelation of the titania-containing silicate solution to form a homogeneous gel can be induced through the use of gelling agents which are conventional for the treatment of soluble silicate solutions. These gelling agents are compounds which uniformly dissolve in the silicate solutions, and which react slowly and uniformly therewith to reduce the pH of the solution through the neutralization of alkali and/or ammonium ion present therein. The result is that silica slowly and uniformly precipitates from and polymerizes within the liquid phase.

Included among the various compounds suitable for promoting gelation in these systems are formaldehyde, paraformaldehyde, formamide, glyoxal, methyl formate, methyl acetate, ethyl formate and ethyl acetate. The rate of gelation typically depends upon the amount of gelling agent introduced into the suspension, as well as on the composition of the gelling agent selected, but useful ranges of addition can readily be determined by routine experiment.

A useful alternative to the use of the above-described gelling agents is a self-induced gelation reaction which commences at a very slow rate following the addition of the colloidal titania suspension to the silicate solution, due to the natural long range instability of the $TiO_2$ sol in strong electrolyte solutions such as potassium silicate solutions. The rate of this precipitation reaction is sufficiently rapid that gelation can occur within an interval of 16-24 hours. This is sufficient to provide a firm gel of good homogeneity and quality but not so slow as to be commercially impracticable.

Silicate solutions and/or colloidal suspensions which may be used to provide the solutions to be treated in accordance with the invention may be formulated of commercially available or other conventional soluble silicate compositions. These compositions are well known, a typical potassium silicate solution of the commercially available type generally comprising about 8.3% $K_2O$, 20.8% $SiO_2$, and the remainder water by weight. A typical colloidal silica suspension will comprise about 40 wt. % $SiO_2$ with the balance $H_2O$.

The gelling of the silicate solutions may be carried out at any temperature within the range from 0°-100° C., with more rapid gelation occurring as temperatures above ambient are used to accelerate the polymerization process. In general, excessive heating of the solution should be avoided in order to avoid differential polymerization rates and/or the generation of gas bubbles or other defects in the evolving gel. Normally, gelation is completed at the point at which the pH of the solution is reduced to a value below about 11 for alkali silicate solutions, or to about 7-10 for ammonium silicate solutions.

The pore sizes in the gelled solutions will vary depending upon factors such as the relative proportion of colloidal $SiO_2$ present in the solution and the rate of gelling, with larger pore sizes, over the typical range of about 100-3000 Å, being favored by lower proportions of colloidal silica and by slower gelling. For best drying of the gels, pore sizes in the range of about 2000-3000 Å are preferred.

Shrinkage of the gels during the gelling process is substantial and can cause cracking of the gelled shape, especially where the gel tends to adhere to the container. Minimization of this cracking is achieved by using nonadhering mold materials, such as wax or fluorocarbon plastic coated molds. Most preferably, the gel is released from the mold as soon as sufficiently gelled to withstand removal, and allowed to complete gelation while freestanding in the supernatant liquid.

Following the formation of a silicate gel in the solution, the gel is subjected to a leaching step to remove excess quantities of alkali metal ions from the silicate structure. This enhances the purity of the silica and thereby improves the chemical durability and desirable thermal expansion characteristics of the product.

Leaching is generally carried out with weakly acidic solutions having pH values greater than about 4. Leaching solutions which are conventional for the treatment of alkali silicate gels can be used, a typical example of such a solution being aqueous ammonium nitrate, at a concentration of about 1 molar or below.

Leaching in these gel systems is diffusion limited and the rate of leaching can be accelerated by increasing the temperature of the system. However, if the pH of the gel is decreased too rapidly, nonuniform leaching and differential condensation of the gel can result, leading to radial cracking of the gel body.

After the gel has been treated for a time sufficient to reduce the alkali level to a sufficiently low value, the gel is dried to remove water or other vehicle constituents and organic reagents from the pore structure thereof. Preliminary drying can be accomplished by simply allowing the semisolid gel to stand in the ambient environment, although forced air drying at 50°-100° C. or microwave heating greatly speeds drying. Overly rapid drying should be avoided however, as this can lead to the occurrence of cracking in the structure.

After loosely-held water and organic reagents are removed from the body by ambient drying, the gel is normally subjected to a further drying or pre-firing treatment to remove bound water and organic constituents. Temperatures above about 1000° C. are suitable for this purpose with a preferred temperature range being about 1000°-1100° C. Heating at temperatures above 1100° C. during pre-firing should not be used, to avoid premature pore closure in the dried gel. Heating times of one hour or more at these temperatures is normally sufficient to substantially remove bound water and organics from the pore structure.

In carrying out this pre-firing treatment, relatively slow heating of the porous body is employed to guard against overly rapid removal of residual water from the pore structure. If fast heating is employed, cracking of the porous body can readily occur. The preferred practice is to heat the porous body at a rate not exceeding about 300° C./hr. to the peak drying temperature employed. Following this treatment, the porous dried gel may be cooled to room temperature and examined for cracks or other defects.

The dried gel produced as described is finally consolidated to transparent, homogeneous glass by further firing. Consolidation can be carried out conveniently at temperatures in the range of about 1350°-1700° C. within time periods of 0.5-4 hours, depending upon the size of the article. As in the case of drying, heating of the article to consolidation temperatures should be relatively uniform, since different consolidation rates can result in shape distortion and/or cracking.

To insure full consolidation and the absence of any entrapped seeds or bubbles in the glass, it may be desirable to carry out the consolidation process in an atmosphere of high diffusibility, such as helium. In this way, complete pore closure is encouraged and the entrapment of residual seeds in the glass is minimized. In some cases, the maintenance of slightly oxidizing conditions in the consolidation atmosphere may also be useful, to avoid undue reduction of $Ti^{+4}$ ions to $Ti^{+3}$.

The invention may be further understood by reference to the following illustrative examples showing the preparation of ultra-low expansion $TiO_2$—$SiO_2$ glasses in accordance therewith.

EXAMPLE I

A homogeneous aqueous alkali silicate solution suitable for the preparation of a low expansion $TiO_2$—$SiO_2$ glass is first provided. The silicate solution is prepared by mixing 180 grams of potassium silicate solution, 20 grams of a colloidal silica sol, 34 grams of water, and 18 grams of formamide, these being mixed and then slowly added to 25 grams of a colloidal $TiO_2$ sol with continual stirring. The potassium silicate solution used is commercially available as Kasil 1 solution from the PQ Corporation, while the colloidal silica sol used is commercially obtainable as Ludox® HS-40 from E. I. duPont de Nemours of Wilmington, Delaware. The colloidal titania sol is a commercially purchased aqueous titanate sol available from the Nalco Chemical Co. of Chicago, Ill., as titania sol TX-2588, containing about 14% colloidal $TiO_2$ by weight and having a pH of about 9.6.

The solution thus prepared is very fluid and exhibits no apparent phase separation or agglomerated material. It is next split into two equal portions and the first portion is allowed to gel overnight in a closed Teflon® plastic container under ambient conditions with only formamide as the gelling agent. The second portion is gelled rapidly by the addition, with rapid stirring, of 1.5 cc of ethyl formate, complete gelation occurring within an interval of about 1 minute following this addition. Condensation of this gel is allowed to proceed overnight, and both gels are then heated to 80° C. for 2 hours to complete the polymerization process.

The semisolid gels produced as described are next dealkalized by exposure to a hot aqueous 0.5 N ammonium nitrate solution. The gel samples are treated by repeated immersion in this solution. After ammonium nitrate rinsing, the gel samples are next repeatedly rinsed in a heated 1N aqueous HCL solution, and are finally rinsed several times with hot distilled water.

Following leaching as described, the samples are preliminarily dried for several minutes in a microwave oven operating at an average power setting of about 500 watts, and then slowly heated to 1000° C. in an electric furnace to remove bound water and residual organic constituents such as introduced by the quaternary ammonium cations. These drying and pre-firing steps not only remove all traces of molecular water from the gel, providing a porous glass preform, but also improve the green strength of the castings.

The dried gel samples thus provided are finally subjected to a consolidation heat-treatment in a helium atmosphere. The samples are heated under helium at a rate of about 20° C. per minute to approximately 1450° C., and maintained at that temperature for about 10 minutes to achieve initial consolidation. They are then further heated in air to 1625° C. and maintained at that temperature for 10 minutes to insure complete consolidation and densification of the glass.

The consolidated glass samples thus provided are finally cooled to room temperature and examined. The products are circular glass wafers, reduced in size from the original castings by about 50 linear percent. The geometry of the original castings is retained, however, and the castings appear totally transparent with a slight yellow tint. The yellow color is a consequence of the presence of $Fe_2O_3$ impurities in the silicate starting materials, but the presence of this impurity does not effect the thermal expansion and chemical properties of the glass.

The $TiO_2$ content of these samples is analytically determined to be about 7.37% by weight, close to the target composition of 7.4% by weight as calculated from the solution. The glass has a density of 2.205 g/cc., a refractive index of 1.483, an annealing point of 1040° C., and a strain point of 937° C.

EXAMPLE II

A homogeneous aqueous alkali silicate solution suitable for making a low-expansion $TiO_2$—$SiO_2$ glass is provided. This solution is prepared by mixing 220 grams of Kasil 1 alkali silicate solution with 35 grams of water, and 20 grams of formamide, and then slowly adding the mixture to 25 grams of the aqueous ammonium titanate sol of Example I with continuous stirring. The resulting mixture again shows no sign of segregation or particulate precipitation, and is stable against gelation for a period of at least several hours.

Employing the gelling procedure reported in Example I, the silicate solution is split into two portions, with the first portion being permitted to gel overnight at ambient temperatures in an enclosed plastic container. The second casting is rapidly gelled by the addition of 1.6 cc of ethylformate, with complete gelation again occurring within an interval of about 1 minute. Further gel condensation occurs by standing overnight, and both samples are heated to 80° C. for 2 hours to ensure completion of the polymerization.

The semisolid gel samples thus provided are dealkalized and preliminarily dried as described in Example I. Thereafter, the porous dried gel samples are consolidated at 1450° C. under helium, followed by a 10 minute exposure to air at 1625° C.

The glass articles thus provided are finally cooled to room temperature and examined. Again, the glass samples are clear with a slightly yellow tint, showing no evidence of phase separation or retained porosity or seeds. The $TiO_2$ content of the samples is analytically determined to be about 7.4% by weight.

EXAMPLES III-VII

Several additional aqueous alkali silicate solutions suitable for preparing low expansion titania silica glasses are provided. The solutions contain varying proportions of potassium silicate solution and colloidal $TiO_2$ sol in order to produce titania-silica glasses over a range of composition in the region of low thermal expansion $TiO_2$—$SiO_2$ glasses.

Table I below reports compositions for 6 silicate solutions prepared for this purpose. Included in Table I for each of the 6 examples shown are the concentration of potassium silicate solution present in the solution, the amount of water added, the concentration of the formamide gelling agent used, and the amount of colloidal $TiO_2$ sol (14% weight $TiO_2$) added to achieve the desired $TiO_2$ concentration in the glass. Also included for each of the solution compositions is the nominal or target $TiO_2$ concentration for the glass product to be produced using the designated solution.

TABLE I

|  | Example No. | | | | | |
| --- | --- | --- | --- | --- | --- | --- |
|  | 3 | 4 | 5 | 6 | 7 | 8 |
| Potassium Silicate (grams) | 110 | 110 | 110 | 110 | 110 | 110 |
| $H_2O$ (grams) | 20 | 19 | 18 | 17 | 16 | 15 |
| Formamide (grams) | 10 | 10 | 10 | 10 | 10 | 10 |
| $TiO_2$ Sol (grams) | 10 | 11 | 12 | 13 | 14 | 15 |
| Nominal $TiO_2$ Content (% weight) | 5.98 | 6.54 | 7.09 | 7.64 | 8.20 | 8.71 |

Each of the representative compositions reported in Table I forms a relatively stable solution substantially free of precipitated $TiO_2$, and each can be converted to a homogeneous $TiO_2$—$SiO_2$ gel by treatment with one or more of the gelling agents hereinabove described.

Gels produced from the solutions shown in Table I above can be leached and preliminarily dried, prefired to remove bound water and organics, and then consolidated to dense, nonporous glass of approximately the target $TiO_2$—$SiO_2$ composition shown in Table I.

Table II below reports the results of such processing for the glass compositions reported in Table I. Included in Table II for selected compositions are the nominal (Nom.) and in some cases the analyzed (Anal.) $TiO_2$ content, in weight percent $TiO_2$, the appearance of the consolidated glasses, and thermal expansion data for glass samples of the compositions described, where determined on individual samples, reported as average coefficient of thermal expansion (C.T.E.) values ($\times 10^{-7}$/°C.) over the temperature range of approximately 0-300° C. In all instances, C.T.E. values are reported for glass consolidated at 1625° C. Some of the samples were refired to 1675° C. to achieve further homogeneity, with lower expansion values generally being observed after refiring at the higher consolidation temperatures.

TABLE II

|  | Ex. No. | | | | | |
| --- | --- | --- | --- | --- | --- | --- |
|  | 3 | 4 | 5 | 6 | 7 | 8 |
| $TiO_2$ (Nom.) (% wt.) | 5.98 | 6.54 | 7.09 | 7.64 | 8.20 | 8.71 |
| $TiO_2$ (Anal.) (% wt.) | — | 6.40 | — | — | 8.08 | 8.64 |
| Glass Appearance | clear, yellow tint | clear, yellow tint | clear, yellow tint | clear, yellow tint | clear. yellow tint | clear. yellow tint |
| C.T.E. ($\times 10^{-7}$) (Consolidated at 1625° C.) | 4.0 | 3.3 | 2.6 | 1.9 | 1.0 | 0.6 |
| C.T.E. ($\times 10^{-7}$) (Consolidated at 1675° C.) | — | 2.2 | 0.9 | — | — | 0.1 |

As the data in Table II indicate, clear $TiO_2$—$SiO_2$ glasses can be prepared in accordance with the invention over a relatively broad range of $TiO_2$—$SiO_2$ composition, and homogeneous glasses having expansion coefficients below that of fused silica glass can readily be provided. Moreover, those glasses generally have optical and thermal expansion properties which are essentially constant over the entire dimensions of the glass products produced.

While glasses provided in accordance with the invention characteristically comprise 1–200 ppm of iron and 10–200 ppm of residual alkali metals, the preferred glasses will nevertheless have average expansion coefficients very near zero over the 0°–300° C. range. Particularly preferred from the standpoint of low thermal expansion are glasses containing about 7–10% $TiO_2$, especially when consolidated within the relatively high consolidation range of 1650°–1700° C.

The low expansion characteristics of glasses provided in accordance with the invention are further illustrated in FIG. 1 of the drawing, which plots sample expansion ($\Delta L$) as a proportion of sample length L, in parts per million, over the temperature range of about 25°–300° C. for three of the inventive glasses. The lowest expansion is demonstrated by a glass containing about 8.71% $TiO_2$.

Figure 2:
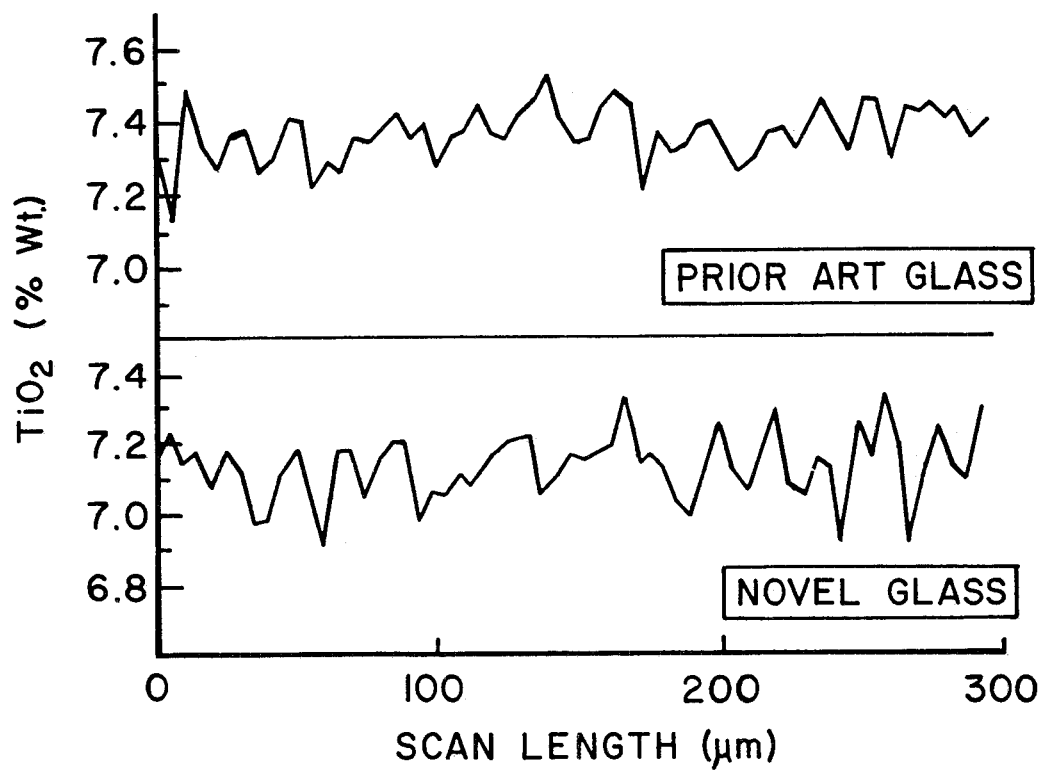
FIG. 2 consists of electron microprobe plots of TiO$_2$ content for a prior art glass and for a glass provided according to the invention.

The homogeneity of glasses provided in accordance with the invention is shown in FIG. 2 of the drawing, which compares surface electron microprobe plots of $TiO_2$ content for a glass of the invention (Novel Glass) and a commercial $TiO_2$—$SiO_2$ glass sold as Corning Code 7971 glass (Prior Art Glass). In those plots the $TiO_2$ content, in weight percent, is shown on the vertical axis and the position on the sample surface is indicated on the horizontal axis, from an arbitrary starting point across a dimension of 300 microns on the sample surface. The homogeneity of the inventive glass is judged to be substantially equivalent to that of the commercial vapor-deposited glass when evaluated by this method.

I claim:

1. A method for making a low expansion $TiO_2$—$SiO_2$ glass which comprises the steps of:
   (a) preparing an aqueous sol wherein the liquid phase comprises at least one soluble silicate compound selected from the group of alkali silicates and ammonium silicates, and wherein the solid phase comprises colloidal $TiO_2$, the sol being formed by combining a $TiO_2$ sol with a silicate solution containing dissolved $SiO_2$ compounds, said aqueous sol having a pH of at least 9 and being substantially free of precipitated $SiO_2$ and $TiO_2$, the proportion of $TiO_2$ in the sol being such as to provide a TiO$_2$ concentration of TiO$_2$ and SiO$_2$;

(b) gelling the sol to form a semisolid silicate gelled shape wherein the colloidal TiO$_2$ is homogeneously distributed;

(c) removing alkaline constituents from the semisolid gelled shape to provide a dealkalized gel;

(d) drying the dealkalized gel to remove water and residual volatile solution components and to provide a porous body therefrom; and (e) firing the porous body to a temperature sufficient to consolidate it to a non-porous TiO$_2$—SiO$_2$ glass article.

2. A method in accordance with claim 1 wherein the sol has an effective silica concentration in the range of about 1–12 moles of SiO$_2$ per liter.

3. A method in accordance with claim 2 wherein the soluble silicate compound is an alkali silicate compound, and wherein the sol has an effective SiO$_2$ concentration of 3–12 moles per liter.

4. A method in accordance with claim 3 wherein the solid phase of the sol additionally comprises colloidal SiO$_2$.

5. A method in accordance with claim 3 wherein the sol is gelled by the addition of a gelling agent thereto which is effective to reduce the pH of the sol to a value at which SiO$_2$ will precipitate therefrom as a semisolid gel.

6. A method in accordance with claim 5 wherein the gelling agent is selected from the group consisting of formaldehyde, paraformaldehyde, formamide, glyoxal, methyl formate, methyl acetate, ethyl formate, and ethyl acetate.

7. A method in accordance with claim 3 wherein the TiO$_2$ is provided as an aqueous colloidal TiO$_2$ suspension containing quaternary ammonium ions and having a pH above about 9.

8. A method in accordance with claim 7 wherein the colloidal TiO$_2$ in the sol is present in a concentration providing a TiO$_2$ content in the range of about 7–10% of the total effective concentration of TiO$_2$ and SiO$_2$ in the sol.

9. A method in accordance with claim 8 wherein the gel has a pore size of 2000–3000 Å.

10. A method in accordance with claim 2 wherein the step of removing alkaline constituents from the semisolid gel comprises the immersion of the semisolid gel in an aqueous acidic medium.

11. A method in accordance with claim 2 wherein the step of drying the dealkalized gel comprises heating the gel to a temperature in the range of about 1000°–1100° C. to volatilize water and organic constituents therefrom.

12. A method in accordance with claim 2 wherein the step of drying comprises microwave heating.

13. A method in accordance with claim 2 wherein the step of firing the gel comprises heating the gel to a temperature in the range of about 1350°–1700° C. to consolidate the gel to a dense, non-porous glass.

* * * * *